United States Patent Office 3,036,001
Patented May 22, 1962

3,036,001
PREPARATION OF CLAY THICKENED GREASE
Donald E. Loeffler, Walnut Creek, Calif., assignor to Shell Oil Company, New York, N.Y., a corporation of Delaware
No Drawing. Filed Apr. 19, 1960, Ser. No. 23,150
5 Claims. (Cl. 252—28)

This invention relates to an improved process for the preparation of clay grease compositions and more particularly pertains to an improved method for the preparation of clay greases wherein the clay is water proofed with a thermosetting resin.

The manufacture of greases gelled with inorganic colloids and particularly with clay has been disclosed in the prior art. In order to maintain the water stability of such greases, it is necessary to provide the clay with hydrophobic surfaces or to otherwise protect it. Various means for achieving this have been proposed in the art such as providing hydrophobic surface active agents including amines, imidazolines, amidoamines and the like. A special high temperature problem has been solved by the water proofing of such greases with thermosetting resins. It is the latter type of composition and its preparation with which this invention is especially concerned.

The main problem involved in the preparation of clay greases is the economic distribution of clay in its highly swollen form throughout a lubricating oil so that it will provide suitable grease forming properties. This can be done by various means such as the "aerogel" process, wherein the colloid is dispersed in a swelling medium such as water, the water displaced with a volatile organic water miscible solvent and the remaining organo gel heated in an autoclave to a temperature above the critical temperature of the solvent with removal of the latter by flashing. This is an expensive process which it would be desirable to avoid. An alternative process involves solvent displacement. In this process, the hydrogel of the inorganic colloid is treated with a water miscible organic solvent such as alcohol or acetone to displace the water, after which the polymer-forming monomers and oil are added. Subsequently, the volatile solvent is removed by evaporation and the remaining ingredients are heated to polymerize and cure the thermosetting resin. The shortcoming with such a process is the poor filterability characteristics of a hydrogel such as is formed by dispersion of a high base exchange clay or the like in water. This can be reduced somewhat by displacement solvents or by filtration, but this involves the use of relatively large amounts of such solvents and relatively expensive processing techniques. A further improvement on the process for the preparation of such greases comprise the addition of a monomeric thermo resin forming material such as aniline to the clay hydrogel for the purpose of improving the filterability of the latter. While this causes a material improvement in the rate of filtration and water removal, it still requires subsequent water displacement with an organic solvent such as methanol, ethanol or acetone. It has been found that even this improved process could not suitably compete economically with grease processes utilizing other high temperature gelling agents and avoiding such solvent displacement techniques.

One of the economic processes for the production of greases gelled with clays comprises the dispersal of clay in water and admixture of the hydrosols so formed with an oil containing an olephilic surface active agent in an amount sufficient to provide substantially increased water resistant properties for the clay gel. Under such circumstances it has been found possible to cause a phase transfer of the clay from water into oil and separation of a substantial amount of water by simple mechanical means such as decanting or its equivalent. This is by far the most economic method for the incorporation of clay in its proper form into an oil while at the same time avoiding relatively expensive methods for water removal. However, the cationic surfactants utilized for this purpose (while providing desirable hydrophobic properties) are not as thermally stable as would be desired for greases to be used at relatively elevated temperatures. The presence of the clay on which the cationic surfactant is absorbed or reacted appears to act as a catalyst for the decomposition of a cationic surfactant as such elevated temperatures. Even with the most stable of lubricating oils used as the principal ingredient for the grease compositions, it has been the experience of experts in this art that waterproofing proportions of cationic surfactants have not been discovered which are as thermally stable as are to be desired.

It is an object of the present invention to provide an improved process for the preparation of grease compositions. It is a special object of this invention to provide an improved process for the preparation of clay greases. It is another object of the invention to provide a process for the preparation of clay greases waterproofed with thermosetting resins wherein the solvent displacement step is avoided and direct transfer of the clay from water into oil is effected.

Now, in accordance with this invention, a process is provided for the preparation of a grease composition which comprises forming a hydrogel of a clay, adding thereto a water immiscible oil and an amount of a cationic hydrophobic surfactant in an amount sufficient to cause transfer of the clay from its water phase into the oil phase; mechanically separating water which forms a separate phase from the grease forming ingredients, adding monomeric thermoplastic-forming ingredients, draining additional water which separates from the grease-forming components and heating the grease composition at a temperature to form the thermosetting resin and substantially completely dehydrate the grease.

The proportion of hydrophobic surfactant such as suitable amine utilized for the purpose of causing transfer of the clay from water into oil is much smaller than that required to provide the clay with hydrophobic properties. It is desirable to utilize a minimum amount of the amine for this purpose since, compared to the thermosetting resin, the amines or other cationic surfactants have a much lower thermal stability. Consequently, it is preferred practice to employ less than about 30 percent based on the clay of the cationic hydrophobic surfactant and preferably an amount between about 12 and 22 percent of surfactant.

The hydrophobic cationic surfactant employed for this purpose are already known for their ability to provide clay greases with hydrophobic properties if they are employed in sufficient amounts for this purpose. Normally this will be between about 50 and 100 percent, based on the weight of the clay. Present requirements for waterproofing clays are more stringent than previously and the minimum amount of hydrophobic cationic surfactant which will provide clays with hydrophobic surfaces meeting current military specifications is in the order of 50 percent by weight of surfactant based on the weight of the clay.

Suitable hydrophobic cationic surfactants are listed in Table 1 below. They comprise several classes of these materials including alkyl amines, dialkyl amines, hydroxyalkylpolyamines, amidoamines and imidazolines as well as mixtures thereof. It is most convenient to utilize those cationic materials which are relatively fluid at the temperature of operation. This is merely a matter of convenience since the surfactant can be put into solution and used in this form. This is a process detail which can be eliminated by employing relatively fluid cationic surfactants such as alkyl amines having 8–12 carbon atoms per molecule. It is an essential part of the invention that a cationic surfactant be employed having at least one hydrocarbon chain of sufficient length that solubility in the lubricating oil medium is assured. Of course, this will vary from one lubricant to another, but with most water immiscible lubricating oils this requires that the cationic surfactant have at least one hydrocarbon chain at least 8 carbon atoms long, either in a straight chain or in a branched chain. The octyl amines are typical examples of the minimum chain length materials which may be employed. It has been found that when shorter chains only are present as hydrocarbon constituents they do not cause the transfer of clay from water into oil to take place.

TABLE 1

*Hydrophobic Cationic Surfactants*

Alkyl amines:
   n-Octyl amine
   2-ethylhexyl amine
   n-Nonyl amine
   2-ethylheptyl amine
   3,5,5-trimethyl amine
   n-Decyl amine
   n-Dodecyl amine
   2,4,6-trimethylnonyl amine
   2-ethyl-4,6-dimethylnonyl amine
   Octadecyl amine
   $C_{10-14}$ mixed alkyl amines
   n-Hexadecyl amine
Dialkyl amines:
   (n-Octyl)(ethyl) amine
   Di(n-octyl) amine
   Bis(2-ethylhexyl)amine
   (2-ethylhexyl)(methyl) amine
Hydroxyalkylpolyamines and amidoamines:
   Tall oil amidoamine of 2-hydroxy-1,3-diaminopropane
   Oleic acid amidoamine of the condensation products of ammonia and epichlorohydrin
   Coconut oil fatty acids amidoamine of tetraethylenepentamine
Imidazolines:
   2-octadecyl imidazoline
   2-hydroxyoctadecyl imidazoline
   1-(propyl)-2-($C_{10-14}$ alkyl) imidazoline
   2-$C_{10-14}$ mixed alkyl imidazolines
   1-(aminoethyl)-2-dodecylimidazoline
   1-(hydroxyethyl)-2-(tall oil HC residue) imidazoline
   1-(hydroxyethyl)-2-heptadecenyl imidazoline It is a preferred practice to condition the clay after its introduction into water by modification with a mineral acid preferably a phosphorus acid such as phosphoric acid. This appears to free base exchange sites on the clay surface and provides the clay with its optimum colloidal state. The amount of acid to be employed for this purpose will vary from one clay to another dependent largely upon the base exchange capacity of the clay. However for high base exchange clays such as the montmorillonites between about 2 percent and about 10 percent by weight of phosphoric acid or its equivalent should be used, based on weight of clay.

While the present invention is especially directed to extreme high temperature lubricating greases, they may be employed for normal operating conditions as well. Hence, and especially useful at operating conditions below about 400° F., any of the well-known lubricating oils may be utilized. These include mineral oil lubricants and lubricating oils of known types, such as the phosphorus esters, silicon esters, aliphatic esters formed by esterification of aliphatic dicarboxylic acids with monohydric alcohols and esters of polyhydric alcohols with monocarboxylic acids. Typical species of these materials include tricresylphosphate, dioctylphthalate, bis(2-ethylhexyl)sebacate, tetra(2-ethylhexyl)silicate, pentaerythritol, tetracaproate, dipentaerythritol hexavalerate, polyphenyl ethers and the like.

Lubricants to be employed at temperatures in excess of about 400° F. are those having an inherent high thermal stability including the halocarbons and organosilicon fluids. The halocarbons may be those described in Peterson et al. Patent U.S. 2,679,479 and include especially the fluorocarbon oils, preferably distilling above about 200° C., at atmospheric pressure. The most useful class of lubricants for grease compositions to be utilized at temperatures in excess of about 400° F. include the organo-substituted silicon fluids of lubricating oil viscosity. Liquid organo-silicon polymers which are adapted for the preparation of the subject high temperature grease compositions may be obtained by the hydrolysis and chemical condensation of one or more hydrolyzable silicon compound having the general formula $R_2SiX_2$ wherein R is a lower alkyl radical and X is a hydrolyzable group selected from the class consisting of halogen and alkoxy groups. They may also be obtained by the hydrolysis and chemical condensation of a mixture of alkylated silicon compounds containing at least 75 mol percent of such dialkyl silicon compound having the general formula $R_2SiX_2$ and not more than 25 mol percent of a monoalkyl silicon compound having the formula $RSiX_3$, or a total of not more than 25 mol percent of both such monoalkyl silicon compound and a trialkyl silicon compound having the formula $R_3SiX$. In all of these formulas, R and X have the meanings stated above. In general, the hydrolyzable silicon compound or mixture of such compounds from which the liquid organosilicon polymers may be prepared is one having an average composition corresponding to the formula $R_{4-z}SiX_z$, wherein z is a whole or a fractional number from 2.25 to 1.5 and R and X have the meanings given above.

Examples of hydrolyzable dialkyl silicon compounds which may be used in preparing the liquid organosilicon polymers are dimethyl silicon dichloride, methyl ethyl silicon dichloride, diethyl silicon dichloride, methyl propyl silicon dichloride, dimethyl dibromide, diethyl silicon dibromide, dimethyl-dimethoxy-silicon, diethyldithoxy-silicon, dimethyl-dithoxy-silicon etc. Examples of hydrolyzable monoalkyl silicon compounds and the hydrolyzable trialkyl silicon compounds which may be present together with the dialkyl silicon compound in an amount not exceeding 25 mol percent of the mixture are methyl silicon trichloride, ethyl silicon tribromide, ethyl silicon trichloride, propyl silicon trichloride, methyl-trimethoxy-silicon, methyl-triethoxy-silicon, ethyl-trithoxy-silicon, trimethyl silicon chloride, trimethyl silicon bromide, triethyl silicon chloride, trimethyl-methoxy-silicon, trimethyl-ethoxy-silicon, triethyl-ethoxy-silicon, etc.

The liquid organosilicon polymer may be obtained by heating the hydrolyzable silicon compound or compounds with water in the presence of a hydrolysis catalyst, e.g., a mineral acid. Hydrolysis of the silicon compounds to form corresponding organosilicols (which silicols are unstable under the reaction conditions and in some instances have not been isolated as such) is accompanied by chemical condensation of the silicols to form the liquid organosilicon polymer (or copolymer) product. The starting materials are selected so that the product contains an average of between 1.75 and 4, and preferably between 1.9 and 2.5, atoms of carbon per atom of silicon.

The viscosity of such polymer or copolymer is, of course, dependent upon the reaction conditions employed in preparing the same, e.g., the polymers of dimethyl silicon vary from thin liquids to viscous liquids to solid resins depending upon the condition under which they are prepared. It is the liquid polymers and copolymers having a preferred viscosity exceeding 500 Saybolt seconds at 100° F., which are usually employed in preparing the new compositions and such liquid polymers of dimethyl silicon are preferred.

When the compositions are to be employed as high temperature lubricants, it is advisable that a substantial proportion of silicon fluids or polyphenyl ethers be utilized for this purpose as an important component of the lubricating oil. Polyphenyl ethers especially useful in these compositions include particularly those having from 3 to 7 phenyl groups per molecule and are either unsubstituted or substituted with tertiary butyl or alpha cumyl substituents. Mixtures of the polyphenyl ethers are preferred since they have lower melting points than the individual components. Moreover it is preferred that at least a third of the polyphenyl ethers present have ether linkages which are in meta positions to each other. Phenyl substituted silicons are satisfactory at elevated temperatures as well. These include especially methyl phenyl silicones wherein the ratio of methyl to phenyl groups is between about 7:1 and about 1½:1 and have viscosities in the range from about 40 to about 550 centipoises at 25° F.

The mixture of the described components, namely the aqueous clay sol, water immiscible lubricating oil, phosphoric acid and cationic surfactant are commingled under sufficient agitation to cause intimate mixing. Under these conditions a large proportion of the water present in the clay hydrosol separates into a phase which may be withdrawn or otherwise mechanically separated from the balance of the grease-forming ingredients after agitation has stopped. In fact, under the proper and desirable conditions of this "direct transfer step," the entire mixture may be moving at a fairly rapid pace over a screen of such dimensions and pore diameter than the separated water passes through the screen while the grease forming ingredients are retained thereon. At this stage, the aqueous mixture comprising water, lubricating oils, amine, acid and clay are preferably in the form of a curd which is readily retained on a screen surface. The screen may be rotating, in fact, so as to knead the curd in such a way that the maximum proportion of water is separated.

Following this initial separation of water, the thermoplastic forming monomers are added. For the purpose of this invention the thermoplastics being contemplated are regarded as aminoplasts and phenoplasts.

The thermosetting resins, especially contemplated for use in the present compositions, comprise those derived from aldehydes as one of the resin-forming components. The classes are clearly described in the book entitled, "Fundamentals of Plastics," edited by Richardson and Wilson, chapters 5 and 6. The authors of said chapters, Barkhuss et al., regard thermosetting resins as being divided into two broad classes, namely those termed "phenoplasts" and a class called "aminoplasts."

The most important species within these two broad groups include the thermosetting phenol-formaldehyde resins, the urea-formaldehyde resins and the melamine-formaldehyde resins. However, other phenols and other amines may be copolymerized with a variety of aldehydes. Phenols include resorcinol, the cresols, the lower alkyl phenols, such as tertiary butyl phenol and tertiary amyl phenol. Aldehydes which may be copolymerized with either the phenols or the amino compounds include formaldehyde, acrolein, furfural, crotonaldehyde and acetaldehyde.

The amino compounds to be utilized together with the aldehyde in addition to or in place of urea and/or melamine include thiourea, aniline, benzene sulfonamide, toluene sulfonamide, alkyl substituted ureas and guanidine. It will be noted by the above classification that other types of resins are excluded from the generic term "thermosetting resin," although it is understood that a number of such materials could be classed either as thermosetting properties but require an unduly long heating period to attain their maximum hardness. Moreover, it has been found that oil-modified alkyls are unsuitable for use in the present invention due apparently to their relatively low thermal stability in the presence of the other grease-forming ingredients as compared with the classes of true thermosetting resins outlined above.

The ratio of phenol to aldehyde preferred for the preparation of optimum phenoplasts may range from about equal mols of phenol and aldehyde monomer to a ratio of about 1 mol of phenol to about 2 mols of aldehyde, preferably the portion is between about 1:1 to about 1.1:1.5. The ratio of monomers to be employed in the preparation of aminoplasts are those wherein the ratio of monomeric amine to monomeric aldehyde is between 1 mol of amine to 1.2–1.7 mols of aldehyde.

The addition of the thermosetting resin monomers has the additional beneficial effect of causing further separation of water from the mixture. This may be drained mechanically such as by settling and draining off the water from the grease-forming ingredients or there may be continuous separation of water on a rotating screen such as that described before.

The final essential steps in the process of this invention comprise heating the grease-forming ingredients to a temperature sufficient to cause polymerization to form the thermoplastic resin on the surface of the clay and drive off any remaining small amounts of water.

It will be noted in the steps of the described process that it is unnecessary to utilize the step of displacement of the water with large amounts of water miscible solvents such as alcohol. Of course, it may be of some advantage to wash the oily curds with superficial amounts of alcohol to eliminate some water but this is not an essential step of the described process.

After the mechanical separation of the further quantities of water, the remaining grease-forming ingredients are heated to cause polymerization of the thermoplastic forming monomers. The temperature of heating is preferably between about 250 and 450° F. suitably between 275 and 400° F. The time of heating is generally within the range from about one-quarter hour to eight hours, preferably between one and four hours. During this period the thermoplastic hydrophobic agent is formed and at the same time any remaining amounts of water are volatilized. If desired, the composition may then be subjected to mechanical working so as to improve the grease structure thereof.

The process of this invention provides a means by which clays primarily hydrophobic with thermoplastic resin may be prepared without resorting to the relatively expensive solvent displacement process heretofore believed to be necessary. The proportion of cationic surfactant which enables this process to be operative is restricted to the minimum amount required to effect direct transfer of the clay into oil from water and is substantially less than the amount required for hydrophobing of the grease composition. Without the additional presence of the thermoplastic resin, in fact, the composition would not have satisfactory hydrophobic properties. Consequently, the invention contemplates the process of preparing greases by an economic means which have improved thermal stability over those obtained when the cationic surfactants are the sole waterproofing agent present. The examples which follow will illustrate the process of this invention.

*Example I*

Hectorite clay was degangued and dispersed in water to form a hydrosol containing about 2 percent by weight of clay. This sol was acidified with 7 percent by weight based on the clay of phosphoric acid. The acidified clay hydrosol was then mixed with normal octyl amine, then with a methyl phenol silicone, the proportion of amine being about 28 percent based on the weight of the clay. The silicone fluid was a methyl phenyl silicone bearing the trade name "DC–510" having a viscosity of about 50 cs. at 25° C. The mixture was agitated for a short period to commingle the ingredients after which it was allowed to stand for separation of water which was then drained from the curd. Aniline and formaldehyde were added in a weight proportion of 100 percent and 32 percent, respectively, based on the weight of the clay. Upon agitation still more water separated which was drained from the mixture. The remaining ingredients were heated at a temperature of about 400° F. for 1 hour and then homogenized on a paint mill to obtain a grease structure, the composition having the following properties: clay 6.5 percent, octyl amine 1.8 percent, aniline-formaldehyde polymer 8.6 percent. The grease composition had a high temperature (450° F.) high speed (10,000 r.p.m.) bearing life of 506 hours.

*Example II*

When the same procedure is adopted for the production of a grease using phenol/formaldehyde polymer as the waterproofing agent, a satisfactory grease structure is obtained. A grease is prepared wherein the components comprise 3.3 percent of a mixture of dodecyl amines as the cationic surfactant, 6.1 percent phenol-formaldehyde resin as the waterproofing agent, 6.4 percent clay and a silicone fluid. The procedure of Example I is followed in the production of this composition, except that the heating was carried out at 350° F. for 1 hour.

*Example III*

The procedure of Example I was followed, utilizing a mineral oil having a viscosity of 65 SSU at 210° F. and 92 V.I., the cationic surfactant being an imidazoline prepared from ethylene diamine and coconut oil fatty acids. The clay was waterproofed with aniline-formaldehyde resin prepared as described in Example I, except the heating was at 260° F. for ½ hour. The grease had the following composition: clay 8 percent, imidazoline 1.5 percent, aniline-formaldehyde resin 6 percent. A high speed bearing test at 300° F. gave a bearing test life of 1108 hours.

*Example IV*

A grease is prepared by the process of Example I, employing as components an aniline-formaldehyde resin waterproofant, clay, a silicone fluid, as the lubricant and the condensation product of tall oil acids with tetraethylenepentamine as the cationic surfactant.

*Example V*

The procedure of Example I was followed to obtain a grease with guanidine-formaldehyde as the waterproofing agent. The grease had the following composition: clay, 7.2 percent, imidazoline, 1.8 percent, guanidine-formaldehyde polymer, 7.7 percent, using a silicone as the fluid, and heating at 265° F. for ½ hour.

I claim as my invention:

1. The process for the formation of a grease composition which comprises forming a clay hydrosol, adding thereto about 20 percent by weight, based on the clay, of an octylamine and a water-immiscible lubricating oil, whereby water separates and is mechanically removed, adding to the remaining mixture a monomeric aminoplast-forming amine compound and an aminoplast-forming aldehyde, mechanically separating further amounts of water, heating at an aminoplast-forming temperature of 250–450° F. sufficient to dehydrate the grease components and homogenizing the components whereby a grease structure is formed.

2. The process for the formation of a grease composition which comprises commingling a mixture of clay, water, phosphoric acid, water-immiscible lubricating oil and 12–22 percent by weight, based on the clay, of an alkyl amine having 8–12 carbon atoms in the alkyl radical, decanting water which separates upon commingling, adding formaldehyde and aniline, decanting further amounts of water from the mixture, heating the dewatered mixture at aminoplast-forming temperatures of 250–450° F. and sufficient to vaporize substantially any remaining water and homogenizing the dehydrated mixture to a grease structure, the amount of alkylamine being insufficient to materially increase the water resistance of the grease, the proportion of aminoplast being sufficient to improve the water resistance of the grease.

3. The process for the formation of a grease composition which comprises commingling a mixture of clay, water, phosphoric acid, water-immiscible lubricating oil and 12–22 percent by weight, based on the clay, of an imidazoline, decanting water which separates upon commingling, adding formaldehyde and aniline, decanting further amounts of water from the mixture, heating the dewatered mixture at aminoplast-forming temperatures of 250–450° F. and sufficient to vaporize substantially any remaining water and homogenizing the dehydrated mixture to a grease structure, the amount of imidazoline being insufficient to materially increase the water resistance of the grease, the proportion of aminoplast being sufficient to improve the water resistance of the grease.

4. The process for the formation of a grease composition which comprises commingling a mixture of clay, water, phosphoric acid, water-immiscible lubricating oil and 12–22 percent by weight, based on the clay, of an oil soluble cationic surface active agent, decanting water which separates upon commingling, adding monomeric aminoplast-forming aldehyde and amine, decanting further amounts of water from the mixture, heating the dewatered mixture at aminoplast-forming temperatures of 250–450° F. and sufficient to vaporize substantially any remaining water and homogenizing the dehydrated mixture to a grease structure, the amount of surfactant being insufficient to materially increase the water resistance of the grease, the proportion of aminoplast being sufficient to improve the water resistance of the grease.

5. The process for the formation of a grease composition which comprises commingling a mixture of clay, water, phosphoric acid, water-immiscible lubricating oil and 12–22 percent by weight, based on the clay, of an oil soluble amidoamine reaction product of a polyethylene polyamine and a fatty acid, decanting water which separates upon commingling, adding formaldehyde and aniline, decanting further amounts of water from the mixture, heating the dewatered mixture at aminoplast-forming temperatures of 250–450° F. and sufficient to vaporize substantially any remaining water and homogenizing the dehydrated mixture to a grease structure, the amount of amidoamine being insufficient to materially increase the water resistance of the grease, the proportion of aminoplast being sufficient to improve the water resistance of the grease.

References Cited in the file of this patent

UNITED STATES PATENTS

| | | |
|---|---|---|
| 2,623,853 | Stross | Dec. 30, 1952 |
| 2,648,633 | Peterson et al. | Aug. 11, 1953 |
| 2,829,100 | Armstrong et al. | Apr. 1, 1958 |
| 2,886,524 | Armstrong et al. | May 12, 1959 |
| 2,890,171 | Armstrong et al. | June 9, 1959 |